(12) United States Patent
Fuchs et al.

(10) Patent No.: US 6,826,801 B1
(45) Date of Patent: Dec. 7, 2004

(54) HINGE BETWEEN A SIDE PIECE AND AN ENDPIECE OF GLASSES

(75) Inventors: Gerhard Fuchs, Pasching (AT); Rupert Spindelbalker, Puchenau (AT)

(73) Assignee: Silhouette International Schmied GmbH and Co. KG, Linz (AT)

( * ) Notice: Subject to any disclaimer, the term of this patent is extended or adjusted under 35 U.S.C. 154(b) by 0 days.

(21) Appl. No.: 09/508,793

(22) PCT Filed: Aug. 20, 1998

(86) PCT No.: PCT/AT98/00198

§ 371 (c)(1),
(2), (4) Date: Mar. 15, 2000

(87) PCT Pub. No.: WO99/14628

PCT Pub. Date: Mar. 25, 1999

(51) Int. Cl.[7] ................................. G02C 5/22
(52) U.S. Cl. ......................................... 16/228
(58) Field of Search .......................... 16/228; 351/117, 351/119, 121, 111, 51, 52, 91, 101, 103, 106, 140, 153; D16/300, 321, 335, 336, 337, 338

(56) References Cited

U.S. PATENT DOCUMENTS

| | | | | |
|---|---|---|---|---|
| 625,083 A | * | 5/1899 | Belt ............................ 351/97 |
| 1,955,690 A | | 4/1934 | Spill |
| 2,192,208 A | * | 3/1940 | Stevens ..................... 351/121 |
| 5,073,020 A | * | 12/1991 | Lindberg et al. ............ 351/106 |
| 5,570,492 A | * | 11/1996 | Nakanishi .................... 16/228 |
| 5,732,444 A | * | 3/1998 | Horikawa et al. ............ 16/228 |
| 5,818,566 A | * | 10/1998 | Carlon et al. ................. 16/228 |
| 5,880,807 A | * | 3/1999 | Devercelli .................. 351/106 |
| 5,894,336 A | * | 4/1999 | Baldissarutti ................ 16/228 |
| 5,903,332 A | * | 5/1999 | Devercelli .................... 16/228 |
| 5,940,164 A | * | 8/1999 | Deppi .......................... 351/95 |
| RE36,882 E | * | 9/2000 | Lindberg et al. ............ 351/106 |
| 6,238,048 B1 | * | 5/2001 | Fukuoka .................... 351/153 |

FOREIGN PATENT DOCUMENTS

| | | |
|---|---|---|
| DE | 94 17 374 | 1/1995 |
| EP | 0 695 962 | 2/1996 |
| EP | 0 814 360 | 12/1997 |
| EP | 0 838 711 | 4/1998 |
| FR | 2 753 283 | 9/1998 |
| GB | 2 281 979 | 3/1995 |
| WO | WO87/04806 | 8/1987 |
| WO | WO97/23803 | 7/1997 |

* cited by examiner

*Primary Examiner*—J J Swann
*Assistant Examiner*—Michael J. Kyle
(74) *Attorney, Agent, or Firm*—Collard & Roe, P.C.

(57) ABSTRACT

A hinge is disclosed between the side piece (2) and the endpiece (1) of the frame of a pair of glasses. The side piece and the endpiece are parts (1, 2) made of wire, of which one bears a hinge body (6) which serves as a hinge axis with a coaxial, peripheral groove (7) for receiving a bearing eye which consists of the bent end (3) of the wire of which the other part (1) is made. The bearing eye forms a peripherally open eyelet (8) which can elastically engage the peripheral groove (7). In order to achieve advantageous manufacturing conditions, the wire of which the part (2) that bears the hinge body (6) is made has a bent, hairpin-shaped end piece (3) which form-fittingly holds between its branches (4, 5) the hinge body (6) on both sides of the peripheral groove (7). The crosspiece (10) located between the two branches (4, 5) of the end piece (3) covers the outer side of the eyelet (8), which forms the bearing eye of the other part (1).

2 Claims, 1 Drawing Sheet

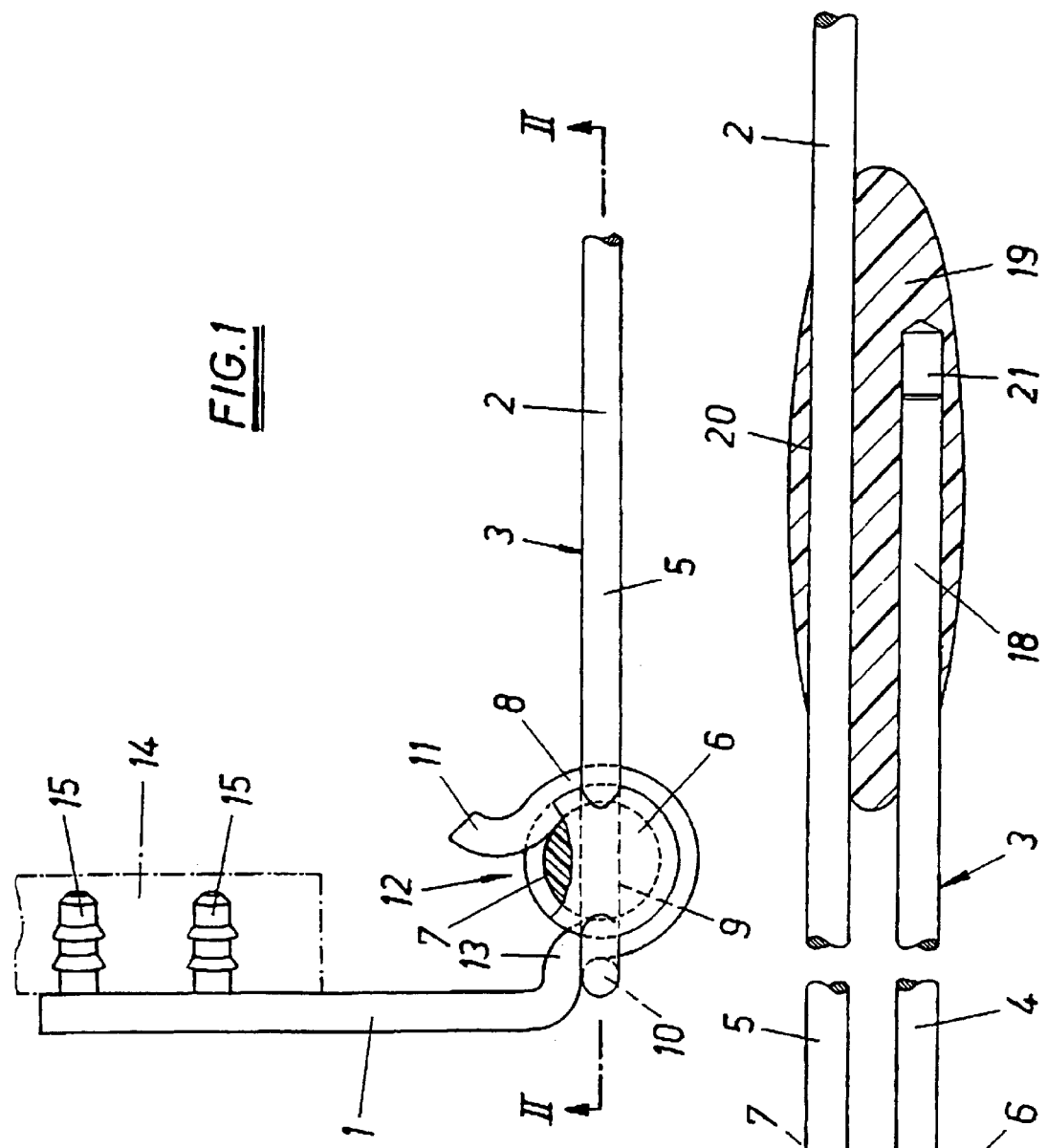

HINGE BETWEEN A SIDE PIECE AND AN ENDPIECE OF GLASSES

The invention relates to a hinge between a side piece and an end piece of a frame for glasses, whereby the side piece and the end piece are parts made of wire, of which one bears a hinge body serving as a hinge axle with a coaxial, peripheral groove for receiving a bearing eye consisting of a bent end piece of the wire of which the other part is made, said bearing eye forming a peripherally open eyelet that can elastically engage the peripheral groove.

In connection with frames for glasses where the side pieces and the end piece are manufactured from a bent wire, it is known (WO 87/04806 A1) to angle off the free end of the wire of the end piece to form a hinge axle that engages a bearing eye. The latter engages an end piece of the wire of the side piece, said end piece being rolled in a screw-like manner. So that the side piece can be mounted adequately clearance-free on the hinge axle and thus secured, accordingly against a tilting movement about a transverse axis relative to the hinge axle, provision has to be made for a plurality of windings for forming the bearing eye. However, the accuracy with which such a hinge is guided cannot satisfy higher requirements in spite of said measure. Furthermore, it is hardly possible to adjust the resistance of the hinge to rotation. In addition, after the hinge axle has been inserted in the winding of the bearing eye, the end piece of the end piece wire forming the hinge axle has to be bent back against the eye of the hinge in order to axially secure the bearing eye on the hinge axle, which cannot be carried out without the use of tools.

If the hinge axle is formed not by a bent off wire end but by a hinge body that is supported by the wire forming the end piece, and which has coaxial peripheral groove for receiving the bearing eye, the latter consisting of an eyelet that is open on the peripheral side and bent from the end piece of the wire of the side piece (GB 2 281 979 A), it is possible to obtain good guiding accuracy for the hinge. However, the drawback with this known hinge is that the wire of the end piece has to be joined with the hinge body with torsional strength, on the one hand, and it is expected to form with an angled off end a rotary stop means for the end piece, on the other hand, which leads to the risk of overstressing of the hinge even if the wire of the end piece coaxially extends through the hinge body. Furthermore, the wire eyelet extending over about 270° can exit from the peripheral groove if comparatively low force of pressure is applied to the side piece, so that the latter is detached from the end piece.

Therefore, the invention is based on the problem of designing a hinge between a side piece and an end piece of a pair of glasses of the type specified above with simple constructional means in such a way that the hinge body can be safely mounted and secured against rotation in a manner meeting higher load requirements as well.

The invention solves the problem posed in that the wire of the part supporting the hinge body has an end piece bent in the form of a hairpin and located between the branches by which the hinge body is held in a form-locked manner on both sides of the peripheral groove, and the connecting crosspiece between the two branches of said end piece grips on the outer side over the eyelet of the other part, said eyelet forming the bearing eye.

Clamping the hinge body between the two branches of a wire end piece bent in the form of a hairpin effectively secures the hinge body against rotation versus said end piece of the wire, whereby the connecting crosspiece between the two branches, said crosspiece enclosing on the outside the eyelet engaging the peripheral groove of the hinge body, represents an additional safety element preventing the eyelet forming the bearing eye from getting unintentionally released from the peripheral groove of the hinge body. Furthermore, the connecting crosspiece between the two branches can be used for limiting the angle of swivel of the hinge if the wire forming the bearing eye has a radially outwardly projecting bridge on the side of the eyelet opening on the peripheral side opposing the free end of the wire, said bridge cooperating with the connecting crosspiece of the hairpin-shaped end piece of the part supporting the hinge body, forming a rotation stop means. Following a preset angle of swivel of the side piece versus the end piece, the bridge projecting radially outwards next to the eyelet is stopped on the connecting crosspiece between the branches of the end piece bent in the form of a hairpin, so that the position of use of the side piece can be constructionally preset in a simple way with the help of said rotation stop means.

If one of the two branches of the hairpin-shaped end piece of the part supporting the hinge body has a stop means protruding against the other branch and engaging a recess of the circumferential groove on the side of the hinge body facing the connecting crosspiece, said stop means serving as a stop for the eyelet guided between said stop means and the connecting crosspiece, the hinge body is safely secured in a simple manner against displacement on the two branches of the hairpin-shaped end piece via the eyelet engaging the peripheral groove because said eyelet is retained between the connecting crosspiece and the stop means against displacement along the branches. This secures the hinge body against displacement as well, as the latter is embraced by the eyelet. Furthermore, one has to take into consideration in this connection that when the pair of glasses is handled, forces of displacement are generally transmitted via the eyelet to the hinge body.

Securing the hinge body against displacement on the branches of the end piece bent in the form of a hairpin is mainly important if the two branches of said end piece extend through the hinge body through passage openings because no additional measures are required in that case for securing the branches against displacement within the passage openings. The leg of the hairpin-shaped end piece having a free end could conceivably be bent over on the outlet side of the passage opening of the hinge body in order to prevent the latter from being pulled off from said branch, but this would require the use of a tool. More advantageous conditions for mounting the hinge body are obtained if the branches of the end piece bent in the form of a hairpin extend continuously parallel with one another. In order to fix with such a design the free end of the one branch against the other branch, the free end of the one branch may engage a blind hole of a closing piece, through which hole the other branch extends in a passage opening. This type of connection of the two branches on the side opposite the connecting crosspiece is particularly recommendable if the side part is employed as the part supporting the hinge body.

The object of the invention is shown by way of example in the drawing, in which:

FIG. 1 shows a top view of a hinge as defined by the invention between a side piece and an end piece of a frame for a pair of glasses, viewed in the direction of the axis of the hinge; and FIG. 2 shows a section through said hinge along line II-II in FIG. 1.

According to the hinge shown between an end piece 1 and a side piece 2, said pieces 1, 2 each being formed from a thin wire, the side piece 2 forms on the side of the hinge an end piece 3 bent in the form of a hairpin. A hinge body 6 is clamped between the branches 4, 5 of said end piece as a hinge axle. Said hinge body 6,is advantageously designed in the form of a rotational body having between the branches 4 and 5 a peripheral groove 7 which is elastically engaged by a peripherally open eyelet 8 formed by the wire of the end piece 1. The arrangement is made in such a way that the branches 4 and 5 of the end piece 3 extend through the hinge body 6 in the passage openings 9, so that the connecting crosspiece 10 between the branches 4 and 5 grips around the eyelet 8 on the outside, as it can be seen especially in FIG. 2. It is therefore not possible to pull off the eyelet 8 from the hinge body 6 in the direction of the branches 4, 5 of the end piece 3 against the connecting crosspiece 10.

On the side of the eyelet opening 12 on the peripheral side, said first-mentioned side opposing the free wire end 11, the eyelet 8 is adjoined by a radially outwardly projecting bridge 13 which, jointly with the connecting crosspiece 10 serving as a counter stop, forms a rotation stop for the hinge, as it can be seen particularly in FIG. 1. From the position of use shown, said position being limited by the stop, the side piece 2 can be pivoted inwardly against a spectacle lens 14, on which the end piece 1 is secured, for example via the dowels 15 engaging holes drilled into the lens. The eyelet 8, which rests elastically against the peripheral groove 7, represents in this connection a clearance-free swivel guide between the end piece 1 and the side piece 2, whereby the motion of swivel can be controlled in a simple way by selecting the initial elastic tension with which the eyelet 8 encloses the hinge body 6 in the peripheral groove 7.

In order to secure the hinge body 6 on the branches 4 and 5 against displacement, said hinge body being only plugged onto the branches 4 and 5 of the end piece 3 of the side piece 2, one of the two branches 4, 5 is provided with a stop 16 for the segment of the eyelet 8 located between the connecting crosspiece 10 and the stop 16, the latter projecting against the other branch. Said stop 16 engages a recess 17 of the peripheral groove 7 of the hinge body 6, so that the stop 16 comes to rest within the peripheral groove 7 and consequently cannot impair the guidance of the eyelet 8 in the peripheral groove 7. Because of said stop 16 the eyelet 8 cannot be displaced along the branches 4 and 5 away from the connecting crosspiece 10, as can be directly seen in FIG. 2. Securing the eyelet 8 against displacement at the same time secures the hinge body 6 against displacement along the branches 4 and 5 because the eyelet 8 embraces the hinge body 6 on the peripheral side.

For mounting the hinge, the hinge body 6 first has to be plugged onto the branches 4 and 5 of the end piece of the side piece bent in the form of a hairpin, until the stop 16 engages the associated recess 17 of the hinge body 6. Subsequently, the eyelet 8 can be threaded into the peripheral groove 10 via the free wire end 11 between the connecting crosspiece 10 and the stop 16, and locked in the peripheral groove 7 in the manner of a snap-lock. Such snap lock-like reception of the eyelet 8 in the peripheral groove 7 is facilitated by the radially projecting wire end 11 and the radially aligned bridge 13, said wire segments providing aids for insertion within the zone of the eyelet opening 12 because the eyelet is widened via said insertion aids when locking into the peripheral groove 6, in order to then rest without play in the peripheral groove 7 under initial elastic tension.

A closing piece 19 can be employed in order to fix the free end 18 of the branch 4 versus the other branch 5 of the end piece 3 bent in the form of a hairpin. As indicated in FIG. 2, said closing piece has a passage opening 20 for the branch 5 and a blind hole 21 for receiving the free end 18 of the branch 4.

What is claimed is:

1. A hinge between a side piece and an end piece of a frame for a pair of glasses, the side piece and the end piece being parts made of wire, one of the wire parts being bent in the form of a hairpin comprised of two branches connected by a crosspiece and bearing a hinge body between the two branches, the hinge body having an axis about which the other wire part may be pivoted, and the hinge body defining a coaxial peripheral groove, and the other wire part has an end bent eyelet having a peripheral opening, the eyelet elastically engaging the peripheral groove and locking the hinge body in position, and the crosspiece gripping the outside of the eyelet, the hinge further comprising a closing piece for the two branches of the one wire part, the closing piece having a blind hole receiving a free end of a lower one of the branches and a passage wherethrough an upper one of the branches extends.

2. A hinge between a side piece and an end piece of a frame for a pair of glasses, the side piece and the end piece being parts made of wire, one of the wire parts being bent in the form of a hairpin comprised of two branches connected by a crosspiece and bearing a hinge body between the two branches, the hinge body having an axis about which the other wire part may be pivoted, and the hinge body defining a coaxial peripheral groove, and the other wire part has an end bent eyelet having a peripheral opening and forming a radially outwardly projecting bridge peripherally opposite a free end of the eyelet, the bridge cooperating with the crosspiece to form a rotation stop, the peripheral groove of the hinge body having a recess, one of the branches of the one wire part having a stop projecting towards the other branch and engaging the recess, and the eyelet extending between the stop and the crosspiece of the one wire part, the eyelet elastically engaging the peripheral groove and locking the hinge body in position, and the crosspiece gripping the outside of the eyelet.

\* \* \* \* \*

UNITED STATES PATENT AND TRADEMARK OFFICE
CERTIFICATE OF CORRECTION

PATENT NO. : 6,826,801 B1
DATED : December 7, 2004
INVENTOR(S) : Fuchs, G. et al.

It is certified that error appears in the above-identified patent and that said Letters Patent is hereby corrected as shown below:

Title page,
Item [30], Foreign Application Priority Data, please insert -- Sept. 17, 1997 (AT) .........A 1563/97 --.

Signed and Sealed this

Fifteenth Day of February, 2005

JON W. DUDAS
*Director of the United States Patent and Trademark Office*